UNITED STATES PATENT OFFICE.

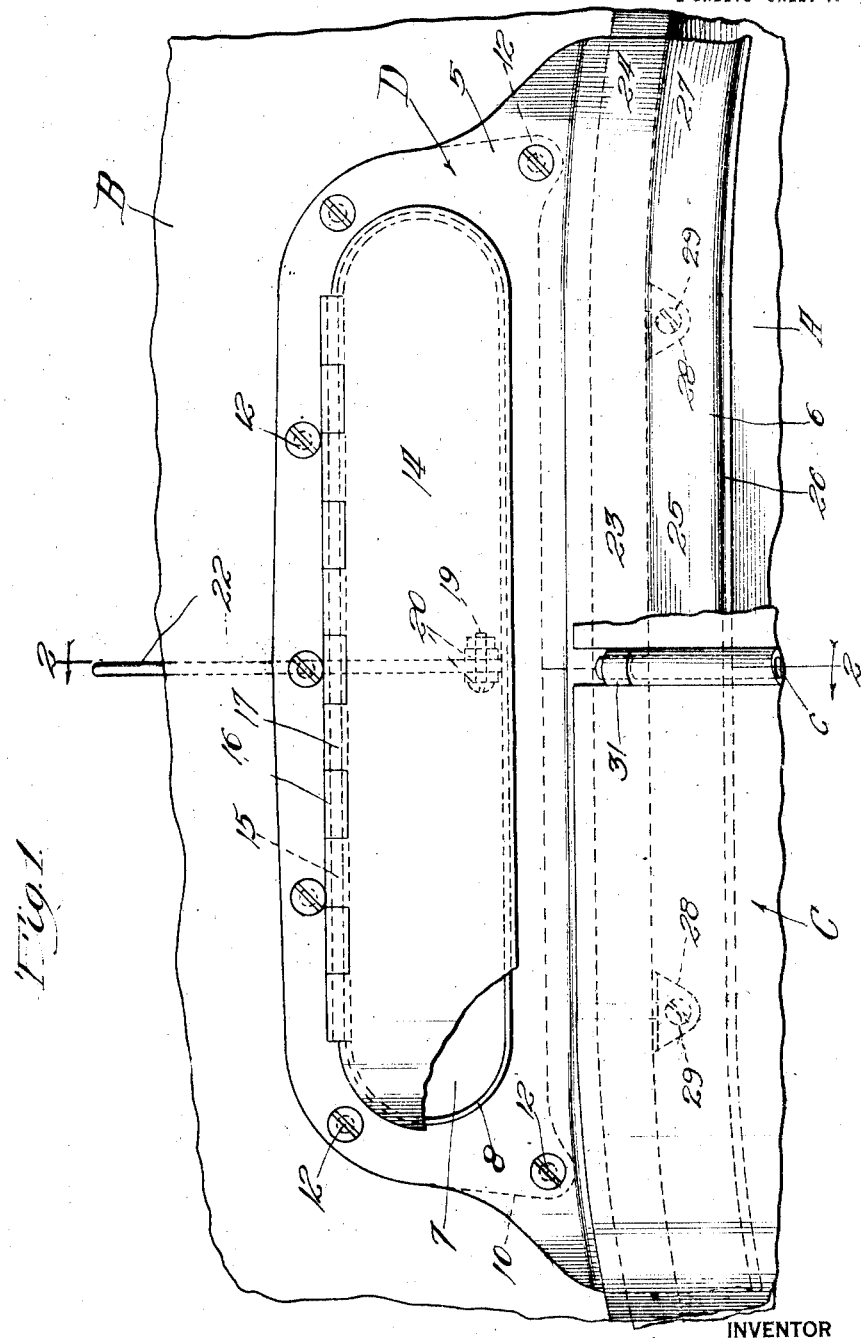

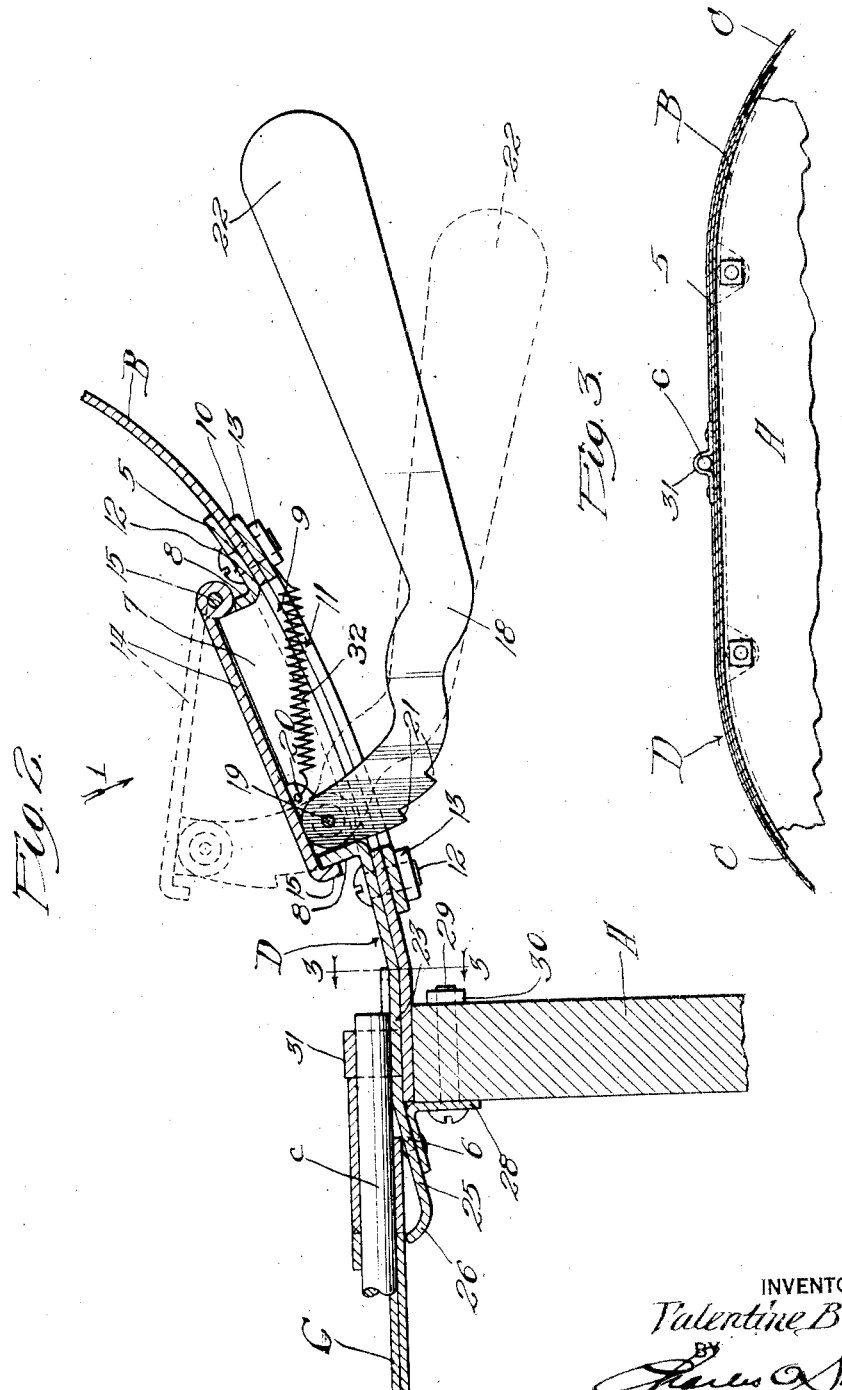

VALENTINE B. KING, OF CHICAGO, ILLINOIS.

AUTOMOBILE VENTILATOR AND RAIN-SHIELD.

1,365,698.  Specification of Letters Patent.  Patented Jan. 18, 1921.

Application filed November 24, 1919. Serial No. 340,193.

*To all whom it may concern:*

Be it known that I, VALENTINE B. KING, a citizen of the United States, and a resident of Chicago, Cook county, and State of Illinois, have invented certain new and useful Improvements in Automobile Ventilators and Rain-Shields, of which the following is declared to be a full, clear, and exact description.

This invention relates to combined automobile ventilators and rain shields and it has been designed especially for use on the well known "Ford" automobile, although it is to be understood that its use is not to be limited to that particular car, but that it may be used with slight modifications on other types of automobiles as well. Considerable heat is developed in the motors of automobiles and much of the heat is radiated to the place adjacent to the front or driver's seat and especially in warm weather the heat at the front seat becomes disagreeable.

One of the objects of the present invention is to provide an improved ventilator for the cowl, whereby a current of air may be admitted to the interior of the body of the car in front of the driver's seat. At the lower end of the cowl is the usual dash board, which carries various instruments and in the case of a "Ford" car supports a coil, battery and other contrivances. Frequently during rain storms the water runs under the hood at the joint between the hood and dash and injures the coil, battery and so forth. One of the objects of the present invention is to provide the ventilator with an extension arranged to project underneath the hood, which covers the motor, and there provided with a gutter or trough arranged to carry the water over and beyond the sides of the coil box and other delicate devices to prevent any water from reaching them. With these and other objects and advantages in view, this invention consists in the several novel features of construction, arrangement and combination of parts hereinafter fully set forth and claimed.

The invention is clearly illustrated in the drawings accompanying this specification, in which:

Figure 1 is a view looking at the top of a combined ventilator and rain shield, embodying a simple form of the present invention, looking in the direction of the arrow 1 in Fig. 2 and showing its connection with fragments of the cowl, dash and hood; Fig. 2 is a vertical, longitudinal section taken on the line 2—2 of Fig. 1, and Fig. 3 is a vertical, cross section taken on the line 3—3 of Fig. 2.

Referring to said drawings, the reference character A designates the dash or dash board of an automobile, which for the purpose of illustration may comprise the well known "Ford" automobile; B designates the cowl and C the hood which covers the motor, said hood being made of two sections hinged together on a rod c. As is customary the adjacent edges of the hood sections are curled up into ears that surround the rod. Usually one end of the rod c is supported by the radiator of the automobile and the rear end is supported in an ear or lug that is secured to and projects up from the dash A. It is understood that the cowl is located in front of the driver's seat and is usually of curved formation, curving backward and upward along the middle and curving downward along the side edges.

The combined ventilator and rain shield is shown at D and may be constructed of sheet metal if desired. The main body portion 5 is shaped to fit the curved outer face of the cowl B and has an extension 6 at its forward side, which projects over the top of the dash A and under the rear end of the hood C to form a rain shield. Said body portion 5 of the ventilator has a transversely extending elongated opening 7 for the admission of a current of air to the interior of the body of the car below the cowl and preferably the metal of the body 5 is turned up around the opening 7 to form a flange 8. Below the opening 7 of the ventilator, the metal of the cowl B is cut away to leave an opening 9, which registers with the opening 7, and against the underside of the cowl B is placed a frame-like plate 10, which is formed with an opening 11 registering with the openings 9, 7. The ventilator is secured to the cowl by bolts 12, which extend through the ventilator body 5, cowl B and frame-like member 10, and have nuts 13 threaded upon their lower ends.

Hingedly secured to the body 5 of the ventilator is a lid or cover 14, which may be formed with a downwardly projecting flange 15 that is arranged to surround the upstanding flange 8 of the ventilator body 5 and thereby form a tight joint therewith. The lid may be hinged to the ventilator body along the rear flange 8 of the opening 7, and for this purpose I have shown a pin 15 extending through ears 16, 17 formed on the ventilator body and lid.

The lid may be held in closed position by gravity, but I have shown a spring 32 for this purpose, and means are provided for opening the lid and holding it in various positions of adjustment. The means shown comprises a lever 18 pivotally connected to the lid by a bolt 19, which extends through ears 20 formed on the underside of the lid, said lever being provided with shoulders 21, adapted for engagement with the upper edge of the forward flange 8 of the ventilator body. The lever 18 is provided with a handle 22 by means of which it may be manipulated to open and close the lid and said handle also acts as a weight to hold either of the shoulders 21 in engagement with the upper edge of the flange 8 to thereby hold the lid 14 in open position.

At the place where the part 6 of ventilator body extends underneath the hood it has a horizontal part 23, which rests upon the upper flat edge of the dash A and the end portions 24 of said horizontal part 23 are curved downward to fit along the usual curved end portion of the dash. In front of the part 23, the ventilator body is bent downward as at 25, to form an inclined surface, the free edge of which is bent up as at 26 to form a gutter or trough at the forward edge of the part 25. The end portions of the inclined part 25 slope downward from the curved parts 24 as at 27 to follow generally the contour of the upper edge of the dash and to provide a shed for shedding the rain water beyond any of the vulnerable parts below the water shield portion. If desired, the shield portion may be provided with downwardly projecting ears or lugs 28 for the reception of bolts 29 that pass through the dash and have nuts 30 upon their ends for securing the forward end or shield portion of the device to the dash. An ear 31 is provided upon the top of the shield portion to receive the hinge rod c of the hood C and this ear takes the place of the usual ear, which is removed from the top of the dash when the device is installed in place.

In operation, the handle 22 of the lever 18 is manipulated to raise and lower the lid 14, and thereby admit a current of air to the interior of the car below the cowl. The lid is held in any position of adjustment by the lever 18, which engages with the flange 8 through its shoulders 21, the weight of the handle of the lever serving to hold said shoulders in engagement with the flange. In case of rain or snow the lid is closed, thereby preventing water from entering through the opening in the ventilator. Any rain falling down the cowl above the ventilator runs down along the upper edge of the ventilator body or along the upper face of the rear flange 8 and runs off the sides of the ventilator body. Any rain falling upon or in front of the lid runs down the curved end portions of the ventilator body, and any rain entering under the hood runs down in the trough at the extreme forward edge of the shield portion of the ventilator body and is carried off by the downwardly curved end portions 27 thereof. In this way any vulnerable parts carried by the dash board or adjacent members are effectually protected by the shield portion of the ventilator body.

More or less variation of the exact details of construction is possible without departing from the spirit of this invention: I desire, therefore, not to limit myself to the exact form of the construction shown and described, but intend, in the following claims, to point out all of the invention disclosed herein.

I claim as new and desire to secure by Letters Patent:

1. A combined ventilator and rain shield attachment for the cowls of automobiles, comprising a ventilator body shaped to conform to the cowl of an automobile and secured to said cowl, there being a portion of the ventilator body extending underneath the hood of the automobile and forming a rain shield, under said hood, and there being registering openings in the ventilator body and cowl, and a lid hingedly secured to said ventilator body over said opening.

2. A combined ventilator and rain shield attachment for the cowls of automobiles, comprising a ventilator body, shaped to conform to the cowl and the top of the dash of an automobile and secured to said cowl and dash and extending over and beyond the dash and underneath the hood and forming a rain shield under the hood, said ventilator body and cowl having registering openings and there being an upstanding flange on the ventilator body defining the opening therein, a lid having a down turned flange arranged to extend over the flange of the ventilator body and means for holding said lid closed and in various open positions.

3. A combined ventilator and rain shield attachment for the cowls of automobiles, comprising a ventilator body shaped to conform to the cowl of an automobile and having a portion extending under the hood of the automobile, said ventilator body being secured to said cowl and there being registering openings in the ventilator body and cowl, an adjustable lid for covering said openings, and the lower end of said ventilator body being formed with a troughlike edge portion for shedding water entering under the hood.

4. A combined ventilator and rain shield attachment for the cowls of automobiles, comprising a downwardly sloping ventilator body having downwardly curved end portions, and a water trough along its forward edge extending down along said downwardly curved end portions, there being an opening in the downwardly sloping portion, a lid for said opening hinged to said body, and a notched lever connected to said lid and arranged to engage said body to hold the lid in open position.

VALENTINE B. KING.